Dec. 4, 1951     A. BUCHI     2,577,180
FRICTION GEAR

Filed June 30, 1947     3 Sheets-Sheet 1

INVENTOR.
BY Alfred Buchi

Dec. 4, 1951  A. BUCHI  2,577,180
FRICTION GEAR

Filed June 30, 1947  3 Sheets-Sheet 2

INVENTOR.
Alfred Buchi

Dec. 4, 1951    A. BUCHI    2,577,180
FRICTION GEAR

Filed June 30, 1947    3 Sheets-Sheet 3

INVENTOR.
BY Alfred Buchi

Patented Dec. 4, 1951

2,577,180

UNITED STATES PATENT OFFICE 2,577,180

FRICTION GEAR

Alfred Buchi, Winterthur, Switzerland

Application June 30, 1947, Serial No. 757,979
In Switzerland July 4, 1946

10 Claims. (Cl. 74—209)

The invention herein described refers to friction roller gears especially for machines, such as rotary blowers, pumps, and the like, on which high circumferential velocities prevail but which have to transmit relatively light circumferential forces (torque) between the driving and driven parts. According to this invention the construction is made in such a manner that at least the gearing stage with the highest speeds is designed as a friction roller gear, and the small friction roller is fastened to the shaft of the high-speed machinery. Around this small friction roller, a plurality of friction rollers or larger size are arranged which are being pressed radially upon the small roller in such a manner that all the forces exerted in pressing the rollers together are counter-acting each other with respect to the axis of the central friction roller.

The remaining stages of the gear in which larger torques but slower rotary speeds prevail can be constructed in various ways, for instance, as far as possible in form of friction gearing, or in form of tooth gearing, hydraulic gear, etc.

The object of this invention can also be devised in such a manner that preferably directly near the highest speed transmission stage there will be at least one additional friction roller gear of the same type for the next slower gearing stage. The large roller of the latter may be arranged coaxially with and in the extension of the high-speed shaft of the first gearing stage, whereas the corresponding smaller friction rollers are connected with the multiple large friction rollers of the highest gear transmission stage, or are built integrally with the latter, and are supported in common bearings. In this manner the larger friction roller gears of the highest gear transmission stage can be pressed together with the smaller friction rollers of the next lower transmission stage against the two coaxially arranged central friction rollers of the two stages. The pressing forces of the outer (planetary) friction rollers will be made equal and directed so that the resulting forces with regard to the central friction roller axis cancel each other out. The inner, free extension of the shaft with highest rotational speed may be supported by bearings directly within the large friction roller of the second highest transmission stage. The latter friction roller may also surround the shaft and contain at least one of its bearings. The outer friction rollers of the second highest speed transmission stage and the friction rollers of the highest transmission stage, which are connected with the former may be pressed against the corresponding inner rollers by a common device. It can be arranged that the smaller friction rollers are pressed against their matching rollers with greater force, and the larger friction rollers are pressed against their matching rollers with lighter force, the forces being so distributed that both gears transmit approximately the same friction moments. A resilient coupling may be incorporated in at least one suitable place in the gear transmission, so that the torques to be transmitted through the friction roller gears specifically during acceleration and/or deceleration of the driven machinery can be limited to an amount permissible for the friction roller gears. The planetary friction rollers which are pressing upon the centrally arranged rollers may be mounted on axes parallel to the central axis but with eccentrically supported shafts, whereby the necessary adhesion pressures are obtained by rotation of these eccentrically supported shafts under the influence of preferably adjustable springs.

The pressing force between the outer friction rollers and the central rollers can be obtained by springs or similar devices which can be arranged to press, for instance, upon bearing parts which are radially guided in the gear casing and which support the outer (planetary) friction rollers. The outer friction rollers can also be supported in levers, each of which may be supported itself at such fulcrum point or fulcrum shaft that these friction rollers are displaceable radially with respect to their matching rollers. This radial motion will also be obtained preferably through springs or the like acting upon these levers by way of a ball joint. By using a ball-type fulcrum on these levers, it can also be arranged that all the friction rollers working together will always have sure line contact (perfect contact along their entire axial length). The bearing support of the outer friction rollers in the gear casing may also be arranged in a resilient manner by the use of springs or other elastic material, to insure a perfect, automatically adjustable, contact of all these friction rollers.

The outer friction rollers can also be pressed upon the inner friction rollers by way of a common device which exerts equal pressures upon all rollers of each transmission stage.

This can also be accomplished, for instance, by one or, in case of two roller gear stages, by two cantilever rings or the like, from which rings multiple springs are arranged to press upon the bearing parts of the outer friction rollers. The outer rollers or their bearings respectively can also be pressed upon the inner friction rollers by annular springs acting radially towards the inside.

The friction roller gearing can be equipped with automatic feeding devices for the type of lubricating oil suitable for it. Any desired type of bearings (sleeve, ball, roller, etc. bearings) may be used for the various shafts of this gear.

The friction roller gear of this type is simple in manufacture since it uses only round, turned parts. It is much less noisy than comparative tooth gear transmissions. Wear of the friction rollers and bearings will be at a minimum because the pressures exerted between rollers are counteracting and cancelling each other. A certain degree of wear of the friction rollers and bearings will be permissible because of the employment of elastic means (springs, etc.) for maintaining proper contact and pressure between the rollers.

In the accompanying drawings, the object of this invention is illustrated in various forms by the nine figures hereunder described; however, it is not limited to the forms shown in these figures:

Corresponding parts have been given the same number.

Fig. 2 shows an axial section along the line I—I of Fig. 3, and Fig. 3 shows a radial section along lines II—II of Fig. 2.

Fig. 6 shows a radial section along line VI—VI of Fig. 7, and Fig. 7 shows an axial section along line VII—VII of Fig. 6.

Figure 1:
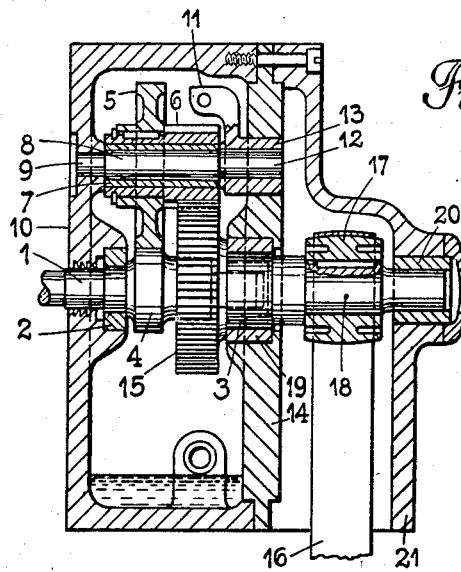
Fig. 1 shows an axial section through a friction roller gear with a single friction roller stage.

In Fig. 1, the driven shaft 1 of the high-speed blower wheel is supported by bearings 2 and 3. On this shaft 1, a friction roller 4 is arranged which is driven by multiple outer friction roller 5. These friction rollers 5 are attached to tooth gears 6 which are part of the second highest transmission stage of the gear. The friction rollers 5 are keyed upon tooth gears 6, the latter are lined with bushings 7 and rotating around the shafts 8. These shafts 8 are rotatably supported on one hand at point 9 in the gearing casing 10, on the other hand in the adjusting levers 11 via the pins 12. The middle part of shafts 8 is, as illustrated later in Fig. 3, arranged eccentrically to the pins 9 and 12. The adjusting levers 11, which are keyed upon shaft pins 12, are supported free to rotate at 13 in the gear casing cover 14. Rotation of the adjusting levers 11 and accordingly of shafts 8, 9 and 12 will press the friction rollers 5 towards the driven friction roller 4. Since the tooth gears 6 are rigidly connected with friction rollers 5, they will also be radially displaced by the rotation of shafts 8, 9 and 12. Consequently these tooth gears 6 will engage more or less closely with the driving tooth gear 15. Since, however, the radial motions between the friction rollers will be infinitesimally small and there will hardly be any wear, there will be only a very small change in center distances between the driving and driven gears in the illustrated embodiment. The tooth gears 6 will therefore engage the driving tooth gear 15 practically always similarly, i. e. with the same clearance.

In Fig. 1 it is assumed that a third transmission stage consists of a belt drive with belt 16 and pulley 17. Thereby the pulley shaft 18 is supported at 19 by a bearing in the gear casing cover 14 and at 20 by a bearing in the gear casing part 21.

Figure 2:
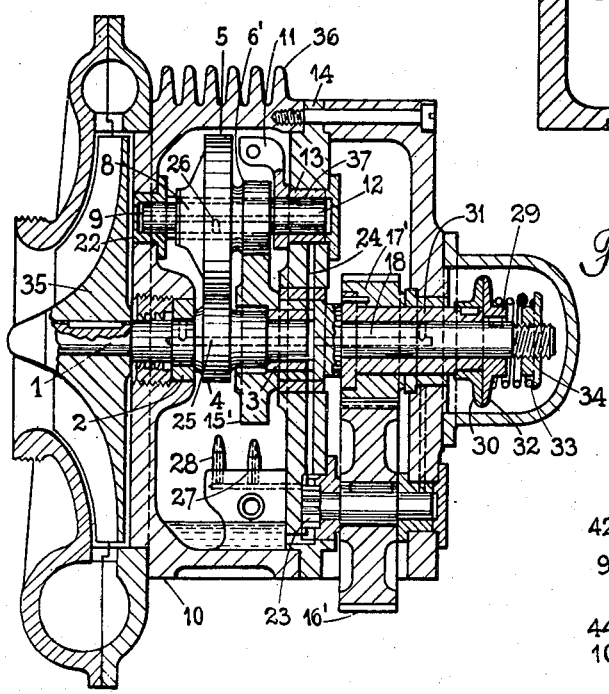
Figs. 2 and 3 show a friction roller gear with two friction stages, whereby
Figure 3:
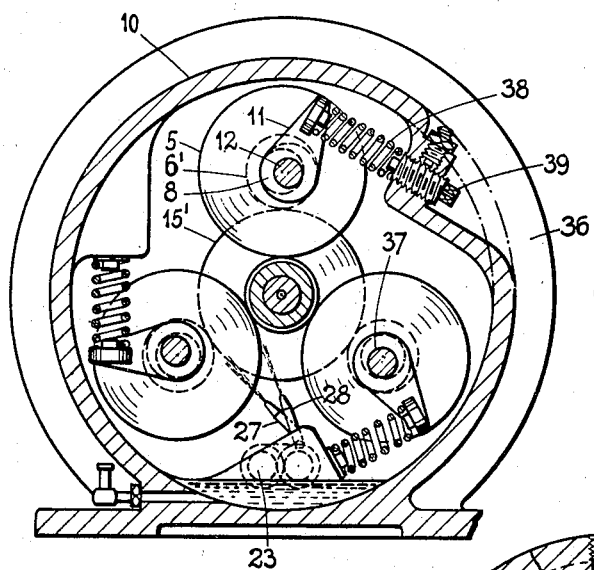

Figs. 2 and 3 show a friction roller gear in which the two highest speed transmission stages ahead of the driven blower wheel are friction roller gears. The driven roller 4 of the highest speed stage is fitted upon the driving shaft 1 of the blower wheel. Roller 4 is supported by bearings 2 and 3. The latter bearing 3 is located within friction roller 15' of the second highest transmission stage. The driving shaft 18 of this friction roller is supported coaxially to shaft 1. Around this friction roller 4 and 15' are arranged, as shown in Fig. 3, three friction rollers 5 and 6' respectively, each radially displaced from rollers 4 and 15'. The friction rollers 5 and 6' are integral, or they are rigidly attached to each other, and rotatably supported on shafts 8. These shafts 8 have end pins 9 and 12. The pins 9 are supported in bushings 22, and the coaxially arranged pins 12 are supported within adjustable levers 11. The latter are rotatably supported in the gear casing cover 14. The levers 11 are rigidly keyed together with the pins 12. The middle part of the friction roller shafts 8 may be eccentric to their outer pins 9 and 12 in such a way that by suitable rotation of lever 11 the friction rollers 5 and 6' are being pressed against the central friction rollers 4 and 15' respectively. The friction roller gear shown here is also equipped with its own lubricating oil feed. Gear pump 23 serves as a lubricating oil pump. This pump feeds lubricating oil through pipes 24 and drill holes 25 and 26 to the various bearing points. Lubrication of the friction rollers is obtained in the shown example by spray lubrication whereby nozzles 27 and 28 spray the lubricating oil towards the line of contact of the friction rollers of the two stages. In case of an embodiment according to Figs. 2 and 3 it is assumed that the third highest transmission stage consists of a tooth gear transmission. Thereby 16' is the driving tooth gear, 17' the driven gear. Tooth gear 17' is now being driven on shaft 18 provided with a slip coupling 29. One half 30 of the coupling sits on shaft 31 of tooth gear 17', and the second half 32 of this coupling is keyed upon shaft 18 of the second highest speed transmission stage 15', 6'. The two coupling halves 30 and 32 are pressed upon each other by spring 33. The tension of spring 33 can be adjusted with the help of nut 34. The tension of spring 33 will be so adjusted that the proper functioning of all the friction roller gear stages is assured, i. e. in such a manner that under no circumstances, not even in case of acceleration or deceleration of the speed of the engaged machines, can there be any slipping of the friction rollers. These friction rollers must always roll upon each other and must never slide upon each other.

As is illustrated in Fig. 2, the shown gear is suitable for driving a blower impeller 35, and the driven friction roller of the highest transmission stage is fastened directly to driving shaft 1 of this blower impeller.

On Fig. 2 the gear casing is equipped with cooling ribs 36. However, liquid cooling could also be employed.

Fig. 3 illustrates also the detailed design of adjusting levers 11 which are rotatably supported along cylindrical surfaces 37, concentrically with shaft pins 9 and 12. The shaft parts 8, which are eccentrically arranged (to pins 9 and 12), are shown in dash-and-dotted lines. The springs 38 act upon levers 11. The springs can be adjusted from the outside by way of screws 39 in such a manner as to create sufficiently high pressures between the friction rollers to permit transmission of the driving torques. These pressures are adjusted as equally as possible. The second highest transmission gear stage (friction rollers 15', 6') requires higher roller pressures than the highest transmission stage because the friction rollers 5 and 4 of the latter have higher circumferential velocities, and the driving friction rollers 5 have larger diameter than 6'. Consequently, the latter rollers (5) transmit smaller circumferential and friction forces. Now, in order to exert on the friction rollers the proper pressures, i. e. different pressure for the two transmission stages, the position of the springs 38 which produce these pressures is displaced axially towards the second highest transmission stage in such a way that the proper pressures are obtained on both friction roller gears.

Figure 4:
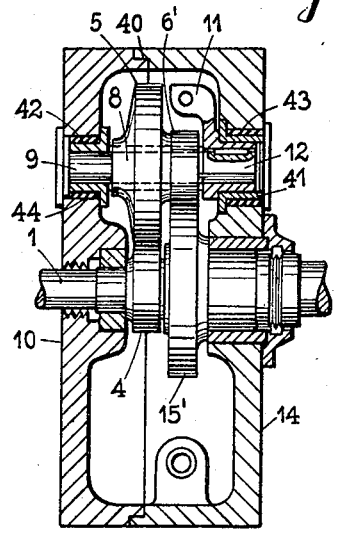
Fig. 4 represents an axial section through a gear of different type, similar to the one shown in Figs. 2 and 3.

Fig. 4 shows an embodiment similar to the one given in Figs. 2 and 3. In this example the gear casing 10 and its cover 14 are divided in the middle at 40. This division is made to act also as centering device for the two parts 10 and 14. Furthermore, this figure illustrates the manner in which bearing bushings 42 for the pins 9, and 41 for the adjusting levers 11, are fitted into elastic or resilient pieces 44 and 43. Now as the springs 38 exert pressure upon the adjusting levers 11, they try to turn shaft 8, 9, 12. Since the shaft section 8 is eccentrically arranged to shaft pins 9 and 12, the two rollers 5 and 6' are thus moved more closely towards the rollers 4 and 15'. If the rollers 5 and 6' are elastically supported, and if they are pressed upon rollers 4 and 15', there is present a certain amount of adjusting margin for equalization of inaccuracies. In this manner a perfect contact of all friction rollers working together upon their whole width is permanently assured.

Figure 5:
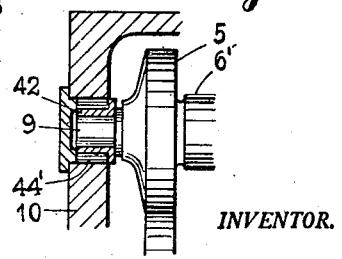
Fig. 5 shows a detail of a different possible type of gearing for the friction rollers.

In Fig. 5 another embodiment of the resilient support of bushing 42 which surrounds pin 9 is illustrated. In this case a spirally wound spring 44' is placed around the bearing bushing 42. This spring is held from the outside through holes in the gear casing 10. The resiliency of the elastic parts 43, 44, and 44' respectively need only be very small if the machining of the gear has been done accurately.

Figure 6:
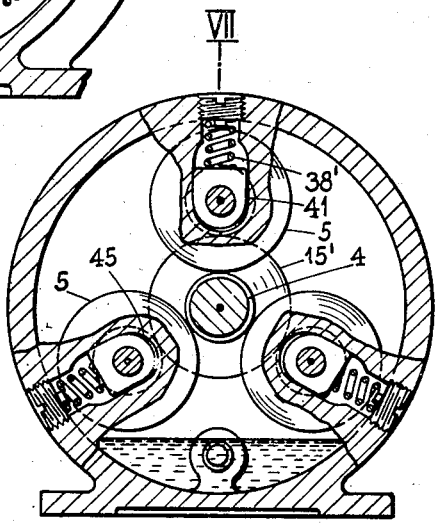
Figs. 6 and 7 illustrate a different embodiment of this invention, whereby
Figure 7:
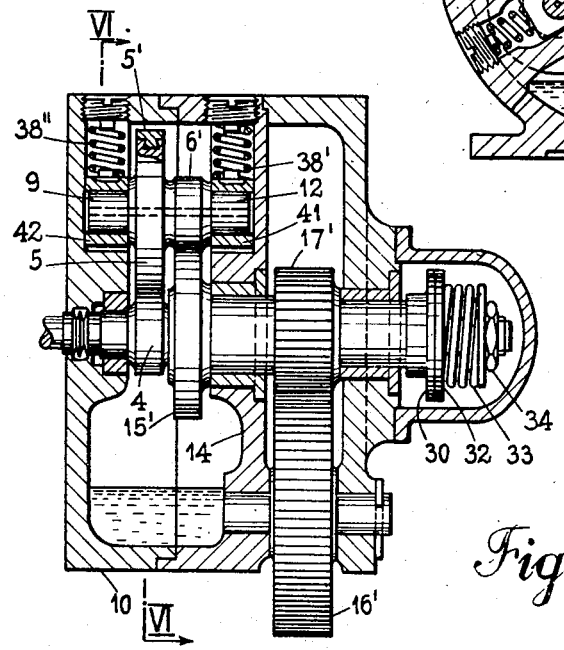

In Figs. 6 and 7 another embodiment of this invention is illustrated whereby the shaft ends 9 and 12 are held in radially displaceable guide bushings 41 and 42. These bushings 41 and 42 are free to move in radial slots 45 machined into the gear casing 10 or into the gear casing cover 14 respectively. Upon these guide bushings 41 act, from the outside, springs 38' and 38" respectively. By these spring forces the roller pairs 5 and 6' are being pressed towards the centrally supported friction rollers 4 and 15' in such a manner that proper friction forces are created at the two transmission stages. Springs 38' must press harder than springs 38".

In Fig. 7 it will also be shown by 5 that direct lines can also be fitted to the friction rollers.

Figure 8:
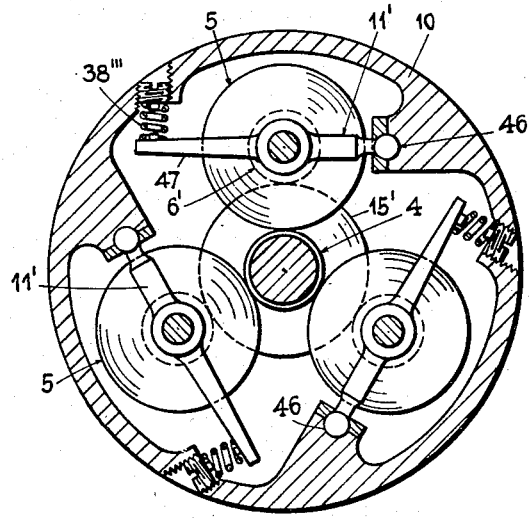
Figs. 8 and 9 show radial sections through one of the other possible embodiments of the invention.

In Fig. 8 another way of the pressing the outer friction rollers upon the inner ones is illustrated merely in a radial section. In this case the friction rollers 5 and 6' are rotatably supported in levers 11' which move around fulcrum points 46. Springs 38''' act upon the outer ends 47 (of these levers 11'). The fulcrum points of levers 11' may be made in form of cylindrical pins or of ball joints. In case of the latter design, friction rollers 5 and 6' can adjust themselves accurately to the friction rollers 4 and 15' under the effect of springs 38'''.

Figure 9:
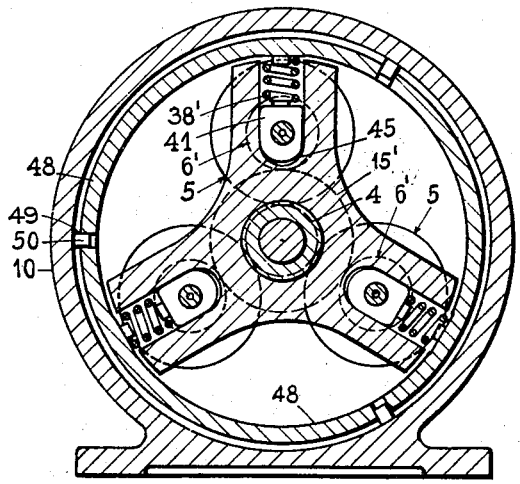

In Fig. 9 another form of the invention which is principally similar to the one illustrated in Fig. 7 is shown. Springs 38' and the springs 38" (not shown) are not resting outside upon the cylindrical wall of the gear casing 10 proper but instead on two rings 48 which are freely supported by three springs 38' and 38" each. Alternatively, a single such ring could be arranged. By this construction I can assure that friction rollers 5 and 4, and 6' and 15', can be pressed upon each other with exactly the same forces, i. e. that the springs 38' and 38" respectively can be tensed equally. To prevent ring 48 from rotating, slots 49 are machined into it, into which engage key-type protrusions 50 from the blower casing 10.

The friction rollers may have metallic surfaces or they may be fitted with friction linings. They may be made in full or in part out of any elastic material, or they may have some resiliency in their adjustment with respect to their counter rollers on account of their construction.

The object of this invention may preferably also be used in the high-speed stages of gears used for speed reduction.

I claim:

1. Multiple stage speed transmission gear for developing high speed rotation from lower speed rotation of a driving shaft, comprising a highest speed shaft in axial alignment with the driving shaft, a small friction roller gear on said highest speed shaft, at least three comparatively larger frictional roller gears about said small roller gear and in frictional contact therewith, a gear comparatively smaller than and in axial alignment and fixedly engaged with each of said larger roller gears to constitute a rotatable idle wheel unit, an axle for and upon which each said unit is adapted to rotate, a casing about all said gears, said casing having means for supporting each of said axles; said means being displaceable at least partially radially of the axis of the highest speed and driving shafts, spring means constantly urging said axle supporting means, and consequently said axles and said units rotatably mounted thereon, radially inwardly toward said highest speed and driving shafts; whereby each of said axles is pivotably maintained being rotatably fulcrumed on the inner bearing surface of the idle wheel unit, a comparatively large gear on the driving shaft, said large gear being in mating contact with the said smaller gears of said units, and said gear casing also containing bearing supporting means for both the driving shaft and the highest speed shaft.

2. Multiple stage speed transmission gear as defined in claim 1 wherein the gearing of the second highest speed transmission stage is also of the friction roller type, and the outer rolls of the last said gearing are pressed together radially inwardly toward the axis of the highest speed and driving shafts with a higher pressure than the pressure between the rolls of the highest speed transmission stage, so that substantially equal friction moments are created between the rolls of the two stages.

3. Multiple stage speed transmission gear as defined in claim 1 wherein the gearing of the second highest speed transmission stage is also of the friction roller type, wherein the axles supporting the said idle wheel units do so eccentrically relative to the axis of the highest speed and driving shafts so that the pressure between the rolls constituting the two transmission stages may be adjusted by rotation of the said axles, and wherein spring means urge rotational translation of the said axles in a direction to increase the pressure between the rolls of both stages.

4. Multiple stage speed transmission gear as defined in claim 1 wherein the gearing of the second highest speed transmission stage is also of the friction roller type, wherein the axles supporting the said idle wheel units do so eccentrically relative to the axis of the highest speed and driving shafts so that the pressure between the rolls constituting the two transmission stages may be adjusted by rotational translation of the said axles, and wherein the said axles are mounted with at least one end in a lever device, spring urged to displace the shaft in a direction to increase the pressure between the rolls of both stages.

5. Multiple stage speed transmission gear as defined in claim 1 wherein the gearing of the second highest speed transmission stage is also of the friction roller type, wherein the axles supporting the said idle wheel units do so eccentrically relative to the axis of the highest speed and driving shafts so that the pressure between the rolls constituting the two transmission stages may be adjusted by rotational translation of the said axles, and wherein the said axles are mounted with at least one end in a lever device, and the said device is supported by a ball joint and is spring urged so that the rolls may move radially as well as axially against their counter rolls.

6. The transmission gear described in claim 1 wherein the spring means are individually adjustable.

7. Multiple stage speed transmission gear for obtaining, from a driving engine, higher speeds than are delivered by the engine, comprising in combination a rotatable highest speed driven shaft, a second shaft parallel with the first, a relatively small driven roll on the first shaft and a relatively large driving roll on said second shaft in engagement with each other constituting the highest speed transmission stage and a relatively small driven roll on the first shaft and a relatively large driving roll in engagement therewith constituting the second highest speed transmission stage, the second shaft being pressed toward the first shaft to create driving friction between the rolls in both transmission stages, said second shaft being further supported eccentrically relative to the first shaft so that the pressure between the rolls constituting the two transmission stages may be adjusted by rotation of the second shaft, and spring means, said spring means being adapted to urge rotation of the second shaft in a direction to increase the pressure between the rolls of both stages.

8. Multiple stage speed transmission gear for obtaining, from a driving engine, higher speeds than are delivered by the engine, comprising in combination a rotatable highest speed driven shaft, a second shaft parallel with the first, a relatively small driven roll on the first shaft and a relatively large driving roll on said second shaft in engagement with each other constituting the highest speed transmission stage and a relatively small driven roll on the second shaft and a relatively large driving roll in engagement therewith constituting the second highest speed transmission stage, the second shaft being pressed toward the first shaft to create driving friction between the rolls in both transmission stages, said second shaft being further supported eccentrically relative to the first shaft so that the pressure between the rolls constituting the two transmission stages may be adjusted by rotation of the second shaft, at least one portion of said second shaft being mounted in a lever-supported bearing, spring urged to rotate the shaft in a direction to increase the pressure between the rolls of both stages.

9. The multiple stage speed transmission gear as defined in claim 8 wherein the lever is supported by a ball joint, and the spring urges the rolls radially as well as axially against their respective counter-rolls.

10. The transmission gear as described in claim 1 wherein the comparatively large gear on the driving shaft has means within its central area for rotatively supporting one end of the highest speed shaft.

ALFRED BUCHI.

REFERENCES CITED

The following references are of record in the file of this patent:

UNITED STATES PATENTS

| Number | Name | Date |
| --- | --- | --- |
| 105,682 | Hitchcock | July 26, 1870 |
| 690,884 | Silvestri | Jan. 7, 1902 |
| 952,033 | Fowler et al. | Mar. 15, 1910 |
| 1,239,541 | Thomas | Sept. 11, 1917 |
| 1,403,018 | Walters | Jan. 10, 1922 |
| 1,415,128 | Suplee | May 9, 1922 |
| 1,631,982 | Potts | June 14, 1927 |
| 1,633,989 | Jones | June 28, 1927 |
| 1,985,645 | Rosner | Dec. 25, 1934 |
| 2,201,176 | Hayes | May 21, 1940 |
| 2,223,872 | McWhorter et al. | Dec. 3, 1940 |

FOREIGN PATENTS

| Number | Country | Date |
| --- | --- | --- |
| 7,539 | Great Britain | May 22, 1888 |